United States Patent [19]

Gioscia

[11] Patent Number: 5,333,827
[45] Date of Patent: Aug. 2, 1994

[54] MOUNTING ASSEMBLY FOR SUSPENDING AN ELECTRICAL APPLIANCE FROM AN ELEVATED CABINET

[75] Inventor: Richard Gioscia, Mahwah, N.J.

[73] Assignee: Sony Electronics, Inc., Park Ridge, N.J.

[21] Appl. No.: 913,026

[22] Filed: Jul. 14, 1992

[51] Int. Cl.$^5$ ............................................. A47F 5/00
[52] U.S. Cl. .................................. 248/289.1; 248/327; 248/333; 248/911; 312/7.1; 312/247
[58] Field of Search ..................... 248/323, 289.1, 327, 248/911, 288.5, 285, 186, 333; 312/7.1, 7.2, 247, 272; 411/535, 536

[56] References Cited

U.S. PATENT DOCUMENTS

| 1,244,879 | 10/1917 | Martin ................................ 248/323 |
| 2,585,569 | 2/1952 | Meneely et al. ................ 248/327 X |
| 3,698,780 | 10/1972 | Collins et al. ....................... 312/245 |
| 4,564,166 | 1/1986 | Craft et al. ..................... 248/288.5 X |
| 4,566,663 | 1/1986 | Barchus ........................ 248/288.5 X |
| 4,580,754 | 4/1986 | Hughes ............................ 248/323 X |
| 4,948,083 | 8/1990 | McNaney, Jr. et al. .... 248/289.1 X |
| 5,180,268 | 1/1993 | Richardson ......................... 411/536 |

FOREIGN PATENT DOCUMENTS

| 543616 | 5/1956 | Italy .................................... 248/327 |
| 2231948 | 11/1990 | United Kingdom ................ 248/327 |

Primary Examiner—Richard K. Seidel
Assistant Examiner—Clark F. Dexter
Attorney, Agent, or Firm—William S. Frommer; Alvin Sinderbrand

[57] ABSTRACT

A mounting assembly for suspending the housing of a radio or other electrical appliance from the elevated bottom wall of a kitchen wall cabinet includes first and second concentric substantially circular members which are turnable and axially movable relative to each other and one of which is fixed to the top of the radio housing, stepped surfaces extending along respective arcs adjacent a periphery of the first member and being selectively engageable by seating elements extending radially from the second member for adjusting the axial position of the second member relative to the first member in dependence upon the rotational position of the first and second members relative to each other, and fasteners adapted to be extended from above through the bottom wall of the cabinet and then through holes in the second member into engagement with tapped bores in the first member for securing the latter to the bottom wall of the cabinet and preventing relative turning of the first and second members so that the adjusted axial position of the second member relative to the first member establishes the desired vertical position of the radio housing in respect to the cabinet.

17 Claims, 3 Drawing Sheets

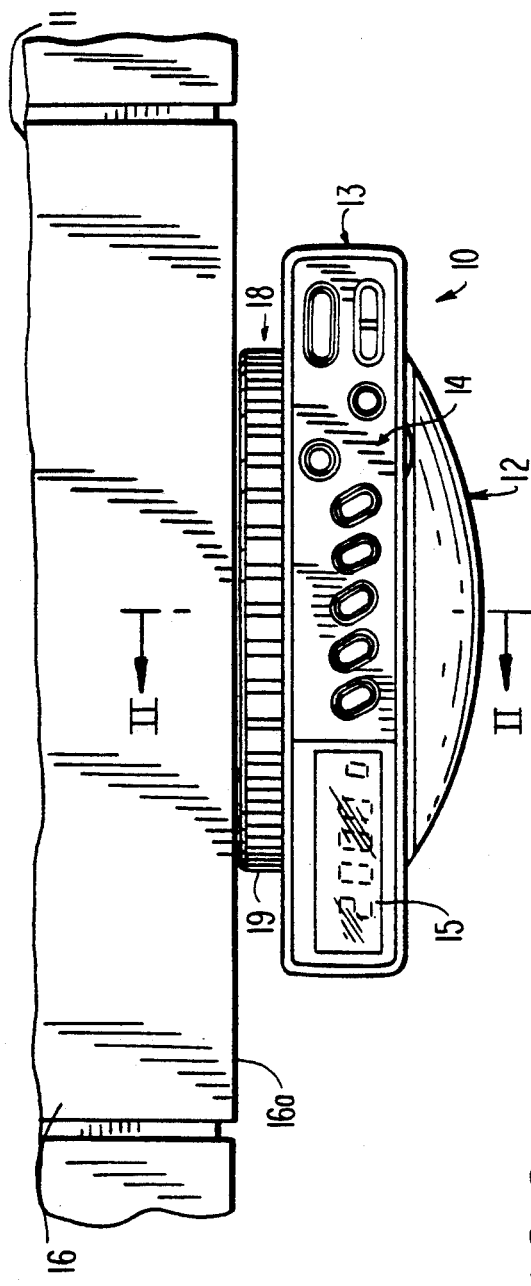
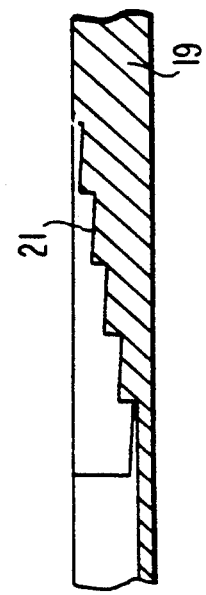
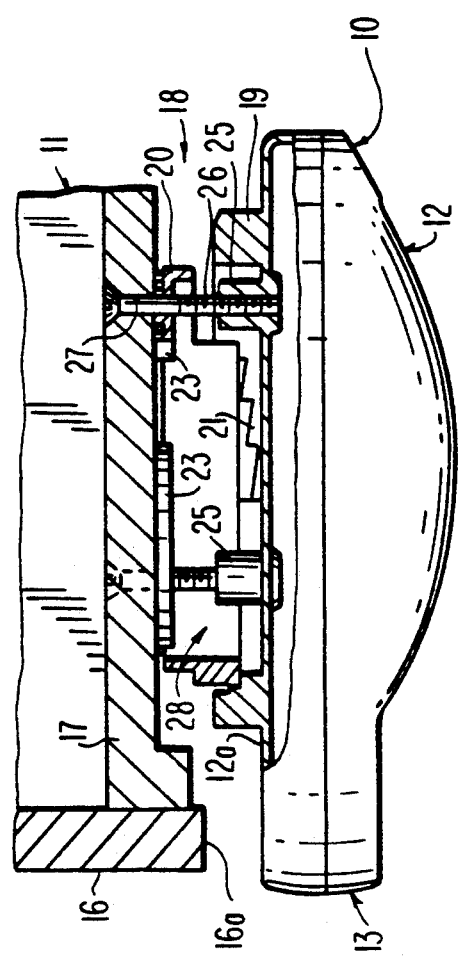

MOUNTING ASSEMBLY FOR SUSPENDING AN ELECTRICAL APPLIANCE FROM AN ELEVATED CABINET

BACKGROUND OF THE INVENTION

1. Field of the Invention

This invention relates generally to the mounting of a clock radio or other electrical appliance underneath a kitchen wall cabinet or other similar structure having an elevated bottom wall.

2. Description of the Prior Art

Clock radios or the like have been provided that are intended for mounting at the underside of a kitchen wall cabinet so that the mounted radio will be clear of the underlying counter surface and will not interfere with food preparation thereon. When such a radio is mounted against the bottom wall or underside of a kitchen wall cabinet, it is desirable that the panel portion of the radio housing which embodies the operating controls and also the time and/or station displays should project forwardly at least to the plane of the front surface of the cabinet doors so as to avoid the casting of a shadow on the panel portion which would interfere with reading of the displays, and further to facilitate manipulation of the controls. However, there are many different types of kitchen cabinet structures, particularly as regards the relationship of the bottom edges of the kitchen cabinet doors to the bottom wall of the cabinet. More specifically, in some kitchen wall cabinets, the doors which swing outwardly on vertical hinges have their bottom edges flush with the bottom wall of the cabinet, whereas, in other kitchen wall cabinets having similarly arranged front doors, the bottom edges of such doors project approximately from 1 to 1¾ inches below the bottom walls of the cabinets. Therefore, existing clock radios or the like intended to be mounted at the undersides of kitchen wall cabinets are provided with separately molded plastic posts or bosses in various heights, and the customer has to select the post or boss of the correct height so that, when he radio housing is suspended from the cabinet with the selected boss interposed between the top of the radio housing and the bottom of the kitchen wall cabinet, the panel portion of the radio housing may project to or beyond the doors at the front of the cabinet without interfering with the opening of such doors. However, the use of a spacing boss separate from the radio housing and the necessity of selecting the correct height thereof undesirably complicate the installation of the radio or the like at the underside of the kitchen cabinet.

OBJECTS AND SUMMARY OF THE INVENTION

Accordingly, it is an object of the present invention to provide an improved mounting assembly for suspending a clock radio or other electrical appliance from the bottom of a kitchen wall cabinet or the like.

More specifically, it is an object of the present invention to provide a mounting assembly, as aforesaid, which facilitates the attainment of a desired spacing of the top of the radio housing from the bottom of the kitchen cabinet when installing a radio thereunder.

Still another object is to provide a mounting assembly, as aforesaid, which employs the same parts for mounting the radio housing or the like at various distances below the bottom wall of the kitchen wall cabinet so as to simplify the manufacturing and distribution of the radios provided with such mounting assembly.

It is still another object of this invention to provide a mounting assembly, as aforesaid, for suspending a radio or other electrical appliance from the bottom wall of an elevated cabinet, and in which the excess length of an electric power cord for the appliance can be stored conveniently.

In accordance with an aspect of this invention, a mounting assembly for suspending the housing of a radio or other electrical appliance from the bottom wall of an elevated cabinet includes a first substantially circular member projecting upwardly from the housing and being integral therewith, a second substantially circular member concentric with the first member and being turnable and axially movable relative to the first member, cooperating means on the first and second members for adjusting the axial position of the second member relative to the first member in response to turning of such members relative to each other, and fastening means adapted to be extended from above through the bottom wall of the cabinet and then through the second member into engagement with the first member for securing the latter to the bottom wall of the cabinet and preventing relative turning of the members so that the adjusted axial position of the second member relative to the first member establishes the desired vertical position of the appliance in respect to the cabinet.

In a desirable embodiment of the invention, the second substantially circular member nests axially within the first member and is adapted to bear against the bottom wall of the cabinet, a plurality of series of upwardly facing steps extend along respective arcuate portions of the first member adjacent the inner periphery thereof with all of the steps rising in the same circumferential direction of the first member, and seating elements extend radially outward from the second member and are selectively engageable with the steps of the respective series thereof in dependence upon the rotational position of the second member relative to the first member.

Further, in a desirable embodiment of the invention, a plurality of tapped bores open upwardly in the first member and are equally spaced from the center thereof by a predetermined radial distance, a plurality of series of holes are spaced apart along respective arcuate portions of the second member and are spaced from the center thereof by the same radial distance as the tapped bores so that selected holes in the series thereof become aligned with the tapped bores in response to turning of the second member relative to the first member, and a plurality of screws are threaded into the tapped bores after passing through holes in the bottom wall of the cabinet and the selected holes of the second member aligned therewith and with tapped bores.

In accordance with another feature of this invention, the above described first and second concentric substantially circular members define a space therein and have radial cutouts which register at least in part in all relative turned positions of the first and second members required for the full range of adjustment of the axial position of the second member relative to the first member so that access may be had through such cutouts to the space defined within the first and second substantially circular members for storage therein of any excess length of the electrical power cord provided on the associated radio or other electrical appliance.

The above, and other objects, features and advantages of the invention, will be apparent in the following detailed description of an illustrative embodiment thereof which is to be read in connection with the accompanying drawings forming a part hereof and wherein corresponding parts are identified by the same reference numerals in the several views.

BRIEF DESCRIPTION OF THE DRAWINGS

FIG. 1 is a front elevational view of a clock radio provided with a mounting assembly in accordance with an embodiment of this invention, and which is shown mounted under a kitchen wall cabinet;

FIG. 2 is a vertical sectional view taken along the line II—II on FIG. 1;

FIG. 9 is a developed view showing one of the stepped surfaces provided in the mounting assembly embodying the invention.

DETAILED DESCRIPTION OF A PREFERRED EMBODIMENT

Figure 3:
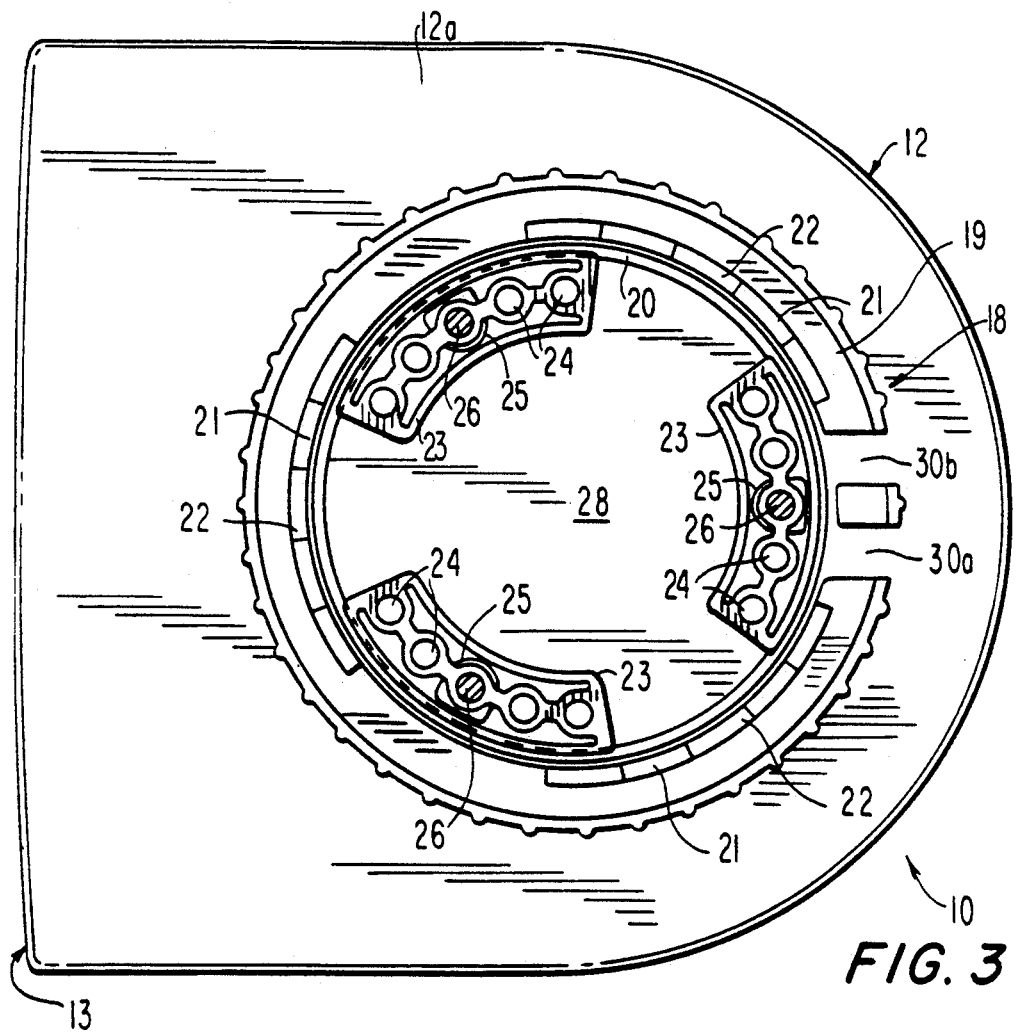
FIG. 3 is an enlarged top plan view of the clock radio and mounting assembly shown on FIGS. 1 and 2, but with the kitchen cabinet removed.

Referring to the drawings in detail, and initially to FIGS. 1 and 2 thereof, it will be seen that the present invention is there shown embodied in a clock radio 10 intended to be suspended under an elevated cabinet 11, such as, a kitchen wall cabinet. The radio 10 is shown to include a generally flat housing 12 preferably molded of suitable plastic resin and formed with a laterally elongated panel portion 13 at the front of the housing. Such panel portion 13 incorporates operating controls 14 of the type usually provided on a clock radio, and a time and/or station display 15 (FIG. 1).

In mounting the radio 10 under the kitchen wall cabinet 11, it is desirable that the panel portion 13 should project forwardly at least to the plane of the front surface of the cabinet doors 16, as clearly shown on FIG. 2, so that the cabinet will not cast a shadow on the panel portion 13 which would interfere with the reading of the display 15, and further to facilitate manipulation of the operating controls 14. However, there are many different types of kitchen cabinet structures, particularly as regards the relationship of the bottom edges 16a of the kitchen cabinet doors 16 to the bottom wall 17 of the cabinet from which the radio 10 is to be suspended. More specifically, the doors which swing outwardly on vertical hinges may have their bottom edges flush with the bottom wall of the cabinet or, as shown on FIG. 2, the bottom edges 16a of the doors 16 may project downwardly an indeterminate distance, which may be from 1 to 1¾ inches, below the bottom wall 17. Therefore, when mounting the radio 10 under the cabinet 11, it is necessary that the top wall 12a of the radio housing 12 be spaced downwardly a suitable distance from the undersurface of the bottom wall 17 of the cabinet so as to provide a reasonable clearance between the bottom edges 16a of the doors and the top wall 12a of the radio housing for avoiding interference with the opening of the doors 16 even though the panel portion 13 of the radio housing desirably projects to or beyond the doors 16. On the other hand, the clearance between the bottom edges 16a of the doors and the top wall 12a of the radio housing should not be excessive both for the sake of presenting a good appearance and for minimizing the intrusion of the radio 10 into the space otherwise provided between the kitchen wall cabinet 11 and the underlying counter top (not shown). Therefore, in suspending the radio 10 from the bottom of the cabinet 11, the vertical distance between the underside of the bottom wall 17 of the cabinet and the top wall 12a of the radio housing is desirably varied in accordance with the distance that the bottom edges 16a of the cabinet doors 16 project below the underside of the bottom wall 17 of the cabinet.

In accordance with the present invention, such variable mounting of the radio 10 in respect to the bottom wall of a cabinet from which it is to be suspended is made possible by a mounting assembly 18 which generally comprises a first substantially circular member 19 projecting upwardly from the top wall 12a of the radio housing 12 and being integral with the latter, and a second substantially circular member 20 configured to nest concentrically within the first member 19 and being turnable and axially movable relative to the latter.

Figure 8:
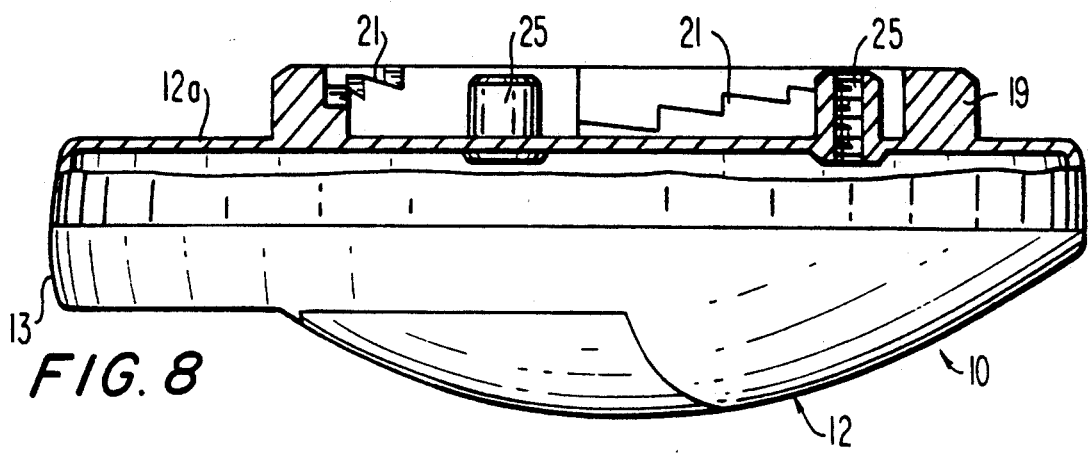
FIG. 8 is a side elevational view of the radio showing the portion of the mounting assembly integral therewith in vertical section.

As shown particularly on FIGS. 3, 8 and 9, the circular member 19 is in the form of an upstanding annular wall on the top wall 12a of radio housing 12 and is formed with three series of upwardly facing steps extending along respective arcuate portions of the member 19 and being recessed in the inner periphery thereof. The three series of steps 21 are equally spaced apart along such periphery of member 19, and the steps 21 all rise in the same circumferential direction of the member 19. Although each series of the steps 21 is shown on FIG. 9 to comprise 5 steps, any other suitable number of steps may be employed. Further, as shown on FIG. 9, the steps 21 individually slope downwardly in the direction in which the steps rise for a purpose hereinafter described in detail.

Figure 5:
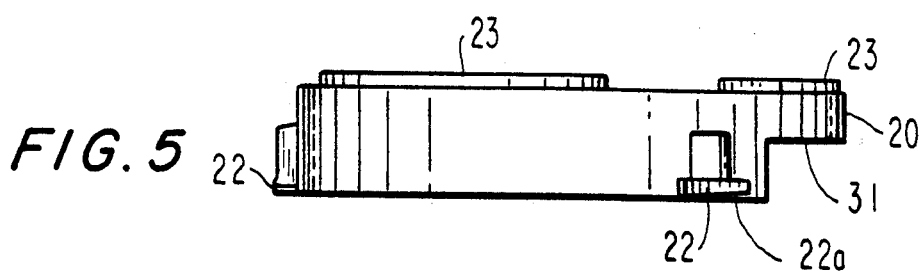
FIG. 5 is a side elevational view of a member included in the mounting assembly embodying the invention.
Figure 6:
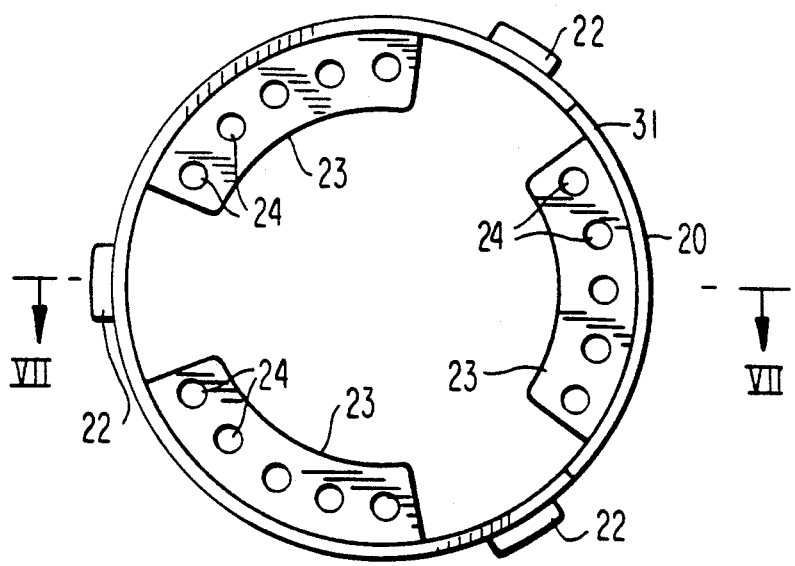
FIG. 6 is a bottom plan view of the member shown on FIG. 5.
Figure 7:
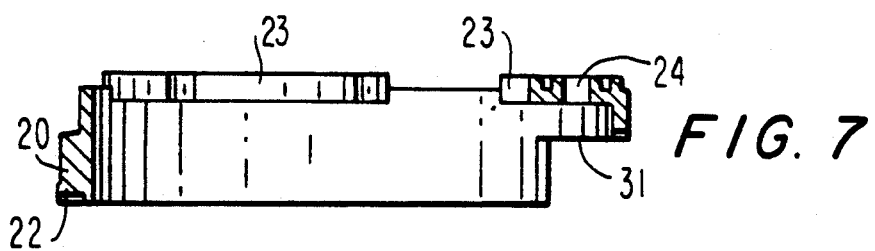
FIG. 7 is a sectional view taken along the line VII-VII on FIG. 6.

Referring now to FIGS. 5–7, it will be seen that the member 20 is desirably in the form of a relatively short cylindrical collar having an outer diameter slightly smaller than the inner diameter of the circular member 19 for permitting the member 20 to nest within the member 19 and to be turnable and axially movable relative to the latter. Three equally spaced apart seating elements in the form of shoes 22 extend radially outward from the member 20 adjacent the bottom edge of the latter and are selectively engageable with the recessed steps 21 of the respective series thereof (FIG. 3) in dependence upon the rotational position of the member 20 relative to the member 19. As shown particularly on FIG. 5, each of the seating elements or shoes 22 has a bottom surface 22a that slopes similarly to the steps 21 so that the complementary sloping surfaces of the steps 21 and shoes 22, when engaged with each other, discourage sliding of the shoes 22 off the steps 21 which have been selected for engagement thereby.

As shown particularly on FIGS. 3 and 6, the circular member 20 is provided with three arcuate flanges 23 extending radially inward from the upper edge of member 20 and being equally angularly spaced apart so that each of the flanges 23 is circumferentially interposed between two of the shoes 22. Each of the flanges 23 is formed with a respective series of holes 24 corresponding in number to the number of steps 21 in each of the series thereof recessed in the member 19. Thus, in the illustrated embodiment of the invention, there are five holes 24 in each of the flanges 23, with such holes 24 being equally spaced apart along an arc which is concentric with the member 20.

As shown on FIGS. 2, 3 and 8, three equally spaced apart threaded bores are defined by internally threaded bosses 25 formed on the top wall 12a of the radio housing 12 within the circular member 19, with each of the bosses 25 being positioned between two of the series of steps 21. The bosses 25 are spaced radially outward from the center of the circular member 19 by a distance equal to the radial distance from the center of the circular member 20 to the center of each of the holes 24 provided in the flanges 23. Thus, in response to turning of the circular member 20 within the circular member 19, a selected hole in each of the series of holes 24 come into alignment with the respective boss 25. Furthermore, the holes 24, in each of the series thereof, are spaced from each other so that, as each of the holes 24 comes into alignment with the respective threaded boss 25, the shoes 22 engage corresponding steps of the respective series of steps 21. Thus, for example, when the middle hole 24 of each of the series thereof is aligned with the respective threaded boss 25, as shown on FIG. 3, each of the shoes 22 is engaged with the middle step 21 of the respective series thereof.

Figure 4:
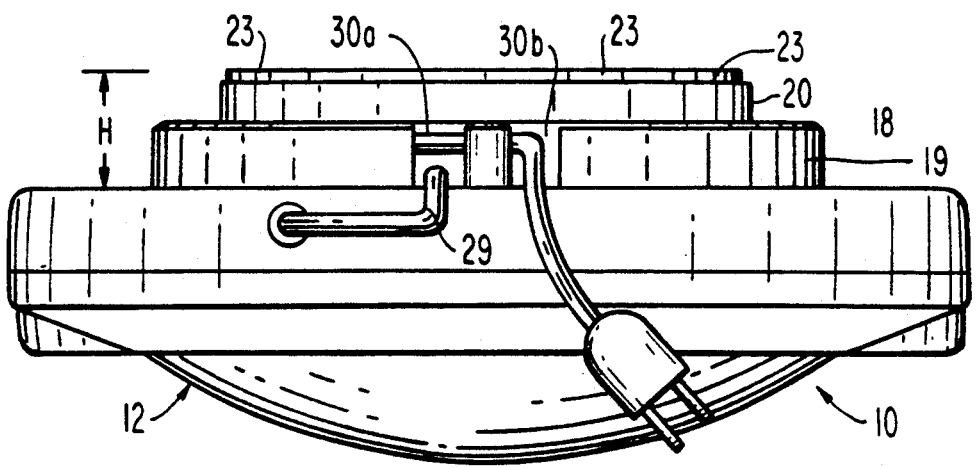
FIG. 4 is a rear elevational view of the clock radio and mounting assembly shown in FIG. 3.

It will be appreciated that, when the circular member 20 is turned relative to the circular member 19 so as to engage the shoes 22 with the lowest steps 21 in the respective series thereof, the circular member 20 will project a relatively small axial distance above the circular member 19, for example, as shown in FIG. 4. However, as the member 20 is turned relative to the member 19 so as to engage the shoes 22 with successively higher steps 21 of the respective series thereof, the axial projection of the member 20 upwardly from the member 19, and hence the height H on FIG. 4, will be incrementally increased. Since the steps 21 are recessed in the inner periphery of the circular member 19, the engagement of the shoes 22 with the ends of the respective series of steps 21 serves to limit the angular extent of the permitted turning of member 20 relative to member 19.

The mounting assembly 18 further includes three screws 26 (FIGS. 2 and 3) adapted to be extended downwardly from above through holes 27 suitably formed in the bottom wall 17 of the cabinet 11 so as to be aligned with selected holes 24 in the respective series thereof, and then extended downwardly through such selected holes 24 into threaded engagement with the tapped bosses 25 within the circular member 19. It will be appreciated that, when the screws 26 are thus engaged, as on FIG. 2, the radio 10 is suspended by the screws 26 from the bottom wall 17 of the cabinet 11, and the screws 26 further serve to prevent turning of the circular member 20 relative to the circular member 19 so that the adjusted axial position of the member 20 relative to the member 19 is maintained and establishes the vertical position of the radio housing 12 in respect to the bottom wall 17 of the cabinet.

When the radio 10 is thus mounted under the cabinet 11, the circular members 19 and 20 serve to confine a space 28 (FIGS. 2 and 3) therein between the top wall 12a of the radio housing and the bottom wall 17 of the cabinet 11. In accordance with the present invention, such space 28 can be employed for the storage therein of any excess length of an electric power cord 29 that extends from the radio housing 12 (FIG. 4). In order to provide access to the space 28, the circular member 19, adjacent the back of the housing 12, is formed with a pair of cutouts 30a and 30b (FIGS. 3 and 4) extending radially therethrough, and the circular member 20 has a cutout 31 extending from the bottom of the member 20 (FIGS. 5-7). The cutout 31 is of sufficient angular extent as to register with the cutouts 30a and 30b in all turned positions of the member 20 relative to the member 19 determined by the engagement of the shoes 22 with the ends of the respective series of steps 21 recessed in the inner peripheral surface of the member 19. Thus, with the circular member 20 removed prior to the mounting of the radio 10, the electric power cord 29 can be lead into the space 28 through the cutout 30a and then coiled within such space prior to being led out therefrom through the cutout 30b (FIG. 4), whereupon the circular member 20 can be installed within the circular member 19 and rotationally adjusted relative to the latter for providing the desired height H (FIG. 4) of the flanges 23 above the top wall 12a of the radio housing 12.

When suspending the radio 10 under the cabinet 11 by means of the above-described mounting assembly 18 embodying this invention, the installer initially measures the distance that the bottom edges 16a of the doors project below the bottom wall 17 of the cabinet, and then rotationally adjusts the circular member 20 relative to the circular member 19 so as to provide the height H with a value that is suitable for that measured distance. The installer notes the holes 24 of the circular member 20 which are aligned with the tapped bosses 25 in the adjusted position of the member 20, and which therefore are selected to ultimately receive the screws 26. Thereupon, the circular member 20 may be removed from within the member 19 and used as a template for drilling the holes 27 in the bottom wall 17 of the cabinet through those selected holes 24 in member 20 which were aligned with the threaded bosses 25 in the adjusted position of the circular member 20. Finally, the circular member 20 is returned to its adjusted position within the circular member 19 which provides the desired value of the height H and, with the flanges 23 of the member 20 pressed upwardly against the underside of the wall 17, the screws 26 are extended downwardly through the holes 27 and those holes 24 which are aligned with the tapped bosses 25 prior to being threadably engaged in the latter. Upon tightening of 1 the screws 26, the radio 10 is securely suspended under the kitchen wall cabinet 11 with the top wall 12a of the radio housing 12 being at the selected distance H from the under surface of the bottom wall 10 of the cabinet against which the flanges 23 bear for providing the desired clearance relative to the bottom edges 16a of the doors 16.

It will be appreciated from the above that the mounting assembly 18 can be readily adjusted for accommodating different types of kitchen cabinets without the need to employ any part specifically designed for such cabinets. By reason of the circular configurations of the members 19 and 20 included in the mounting assembly 18, the height H is simply varied in response to a rotational movement of the circular member 20 relative to the member 19, that is, the height H can be changed by a dial-like adjustment. By reason of the sloping surfaces of the steps 21 and the shoes 22, as previously referred to, the circular member 20 after being rotatably adjusted to a desired position, will securely remain in that position while the radio 10 is being mounted under the cabinet 11. Finally, as previously described, the mounting assembly 18 provides a convenient storage space 28 for any excess length of the electric power cord 29 when the radio 10 is mounted under the cabinet 11.

Although the invention has been specifically described as applied to the mounting of a clock radio 10 under a kitchen wall cabinet 11, it is apparent that the invention can be similarly applied to the mounting of any other type of radio or electrical appliance under a cabinet or the like having an elevated bottom wall.

Having described in detail a preferred embodiment of the invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. A mounting assembly for suspending an electrical appliance from a bottom wall of an elevated cabinet, comprising:

first and second concentric substantially circular members which are turnable and axially movable relative to each other, and one of which is fixed to the electrical appliance;

cooperating means on said first and second members for adjusting the axial position of the other of said first and second members which is not fixed to the electrical appliance relative to said one member which is fixed to the electrical appliance in response to turning of said members relative to each other to a predetermined angular extent about an axis at their centers; and a plurality of fastening means spaced radially about said centers of said first and second members, each fastening means extending through the bottom wall of the cabinet, through a selected one of a plurality of holes in said other member and into engagement with said one member for securing said one member to the bottom wall of the cabinet and preventing relative turning of said members so that the adjusted axial position of said other member relative to said one member establishes a vertical position of the appliance in respect to the cabinet.

2. The mounting assembly according to claim 1; in which said cooperating means on said first and second members includes a plurality of stepped surfaces on said first member extending along respective arcs which are concentric with the center of said first member adjacent a periphery of said first member and arranged in a direction of said axis about which said first and second members are relatively turnable, and seating elements extending radially from said second member, each seating element being selectively engaged with one of said stepped surfaces, in dependence upon the rotational position of said members relative to each other.

3. The mounting assembly according to claim 1; in which said first substantially circular member is said one fixed to the electric appliance and said second substantially circular member nests axially within said first member and is adapted to bear against the bottom wall of the cabinet; and in which said cooperating means include a plurality of series of upwardly facing steps on said first member extending along respective arcuate portions of said first member adjacent the inner periphery thereof, said series of steps all rising toward at least a portion of said second member when progressing in the same circumferential direction of said first member, and seating elements extending radially outward from said second member, each seating element being selectively engaged with one of said steps of the respective series thereof in dependence upon a rotational position of said second member relative to said first member.

4. The mounting assembly according to claim 3; in which said one member includes a plurality of tapped bores engaging said fastening means, said tapped bores opening upwardly toward at least said portion of said second member and being equally spaced from the center of the first member by a predetermined radial distance, the selected holes in said second member being part of a plurality of series of holes spaced apart along respective arcuate portions of said second member and being spaced from the center of said second member by said radial distance so that the selected holes in said series thereof become aligned with said tapped bores in response to turning of said second member relative to said first member, and said plurality of fastening means includes a plurality of screws threaded into said tapped bores after passing through said selected holes aligned therewith.

5. The mounting assembly according to claim 3; in which said steps individually slope downwardly in said circumferential direction in Which the steps rise, and in which said seating elements have similarly sloping bottom surfaces being engaged with selected sloping steps and discouraging sliding of said seating elements off the steps engaged thereby prior to engagement of said fastening means with said first member.

6. The mounting assembly according to claim 1; in which said first and second concentric substantially circular members define a space therebetween, and have cutouts which register at least in part in all of the adjusted axial positions of said first and second members when turned relative to each other to said predetermined angular extent and form an opening for access through said cutouts to said space for storage therein of an electric power cord for the appliance.

7. An electrical appliance in combination with a mounting assembly, the electrical appliance comprising a housing, and the mounting assembly being adapted for suspending said housing from a bottom wall of an elevated cabinet; said mounting assembly including a first substantially circular member projecting upwardly from said housing and being integral with said housing, a second substantially circular member concentric with said first member and being turnable and axially movable relative to said first member, cooperating means on said first and second members for adjusting the axial position of said second member relative to said first member in response to turning of said members relative to each other to a predetermined angular extent about an axis at their centers, and a plurality of fastening means spaced radially about said centers of said first and second members, each fastening means extending through the bottom wall of the cabinet, through a selected one of a plurality of holes in said second member and into engagement with said first member for securing said first member to the bottom wall of the cabinet and preventing relative turning of said members so that the adjusted axial position of said second member relative to said first member establishes a vertical position of the appliance in respect to the cabinet.

8. The electrical appliance in combination with the mounting assembly according to claim 7; in which said cooperating means on said first and second members include a plurality of stepped surfaces on said first member progressing upwardly toward at least a portion of said second member and extending along respective arcs which are concentric with the center of said first member adjacent a periphery of said first member, and seating elements extending radially from said second member, each seating element being selectively engaged with one of said stepped surfaces in dependence upon the rotational position of said members relative to each other.

9. The electrical appliance in combination with the mounting assembly according to claim 7; in which said second substantially circular member nests axially within said first member and is adapted to bear against the bottom wall of the cabinet; and in which said cooperating means include a plurality of series of steps on said first member facing upwardly toward at least a portion of said second member and extending along respective arcuate portions of said first member adjacent an inner periphery thereof, said series of steps all rising in the same circumferential direction of said first member, and seating elements extending radially outward from said second member, each seating element being selectively engaged with one of said steps of the respective series thereof in dependence upon a rotational position of said second member relative to said first member.

10. The electrical appliance in combination with the mounting assembly according to claim 9; in which said first member includes a plurality of tapped bores engaging said fastening means, said tapped bores opening upwardly toward at least said portion of said second member and being equally spaced from the center of the first member by a predetermined radial distance, the selected holes in said second member being part of a plurality of series of holes spaced apart along respective arcuate portions of said second member and being spaced from the center of said second member by said radial distance so that the selected holes in said series thereof become aligned with said tapped bores in response to turning of said second member relative to said first member, and said plurality of fastening means includes a plurality of screws threaded into said tapped bores after passing through said selected holes aligned therewith.

11. The electrical appliance in combination with the mounting assembly according to claim 9; in which said steps individually slope downwardly in said circumferential direction in which the steps rise, and in which said seating elements have similarly sloping bottom surfaces being engaged with selected sloping steps and discouraging sliding of said seating elements off the steps engaged thereby prior to engagement of said fastening means with said first member.

12. The electrical appliance in combination with the mounting assembly according to claim 7; further comprising an electric power cord extending from said housing; and in which said first and second concentric substantially circular members define a space therebetween, and have cutouts which register at least in part in all of the adjusted axial positions of said first and second members when turned relative to each other to said predetermined angular extent and form an opening for access through said cutouts to said space for storage therein of said electric power cord.

13. The electrical appliance in combination with the mounting assembly according to claim 7; further comprising a radio within said housing.

14. In combination with a kitchen wall cabinet having an elevated bottom wall, and forwardly opening front doors that project an indeterminate distance below said bottom wall, a radio having a housing, and mounting means for suspending said radio from said bottom wall so as to avoid interference with opening of said front doors; said mounting means including a first substantially circular member projecting upwardly from said housing and being integral with said housing, a second substantially circular member concentric with said first member and adapted to bear against said bottom wall, said second member being turnable and axially movable relative to said first member, cooperating means on said first and second members for adjusting the axial position of said second member relative to said first member in response to turning of said members relative to each other to a predetermined angular extent about an axis at their centers, and fastening means extending through said bottom wall of the cabinet, through said second member and into engagement with said first member for securing said housing to the bottom wall of the cabinet and preventing relative turning of said members so that the adjusted axial position of said second member relative to said first member establishes a vertical position of said housing in respect to said bottom wall of the cabinet, and thereby ensures adequate clearance for the opening of said doors.

15. The combination as in claim 14; in which said cooperating means include a plurality of series of steps on said first member facing upwardly toward at least a portion of said second member and extending along respective arcuate portions of said first member adjacent an inner periphery thereof, said series of steps all rising toward at least said portion of said second member when progressing in the same circumferential direction of said first member, and seating elements extending radially outward from said second member, each seating element being selectively engaged with one of said steps of the respective series thereof in dependence upon a rotational position of said second member relative to said first member.

16. The combination as in claim 15; in which said first member includes a plurality of tapped bores engaging said fastening means, said tapped bores opening upwardly toward at least said portion of said second member and being equally spaced from the center of the first member by a predetermined radial distance, the selected holes in said second member being part of a plurality of series of holes spaced apart along respective arcuate portions of said second member and being spaced from the center of said second member by said radial distance so that the selected holes in said series thereof become aligned with said tapped bores in response to turning of said second member relative to said first member, and said fastening means includes a plurality of screws extending downwardly through holes in said bottom wall of the cabinet registering with said selected holes and then extending through said selected holes and into threaded engagement with said tapped bores aligned therewith.

17. The combination as in claim 16; in which said radio further has an electric power cord extending from said housing, and in which said first and second concentric substantially circular members define a space therebetween under said bottom wall, and have cutouts which register at least in part in all of the adjusted axial positions of said first and second members relative to each other when turned to said predetermined angular extent and form an opening for access through said cutouts to said space for storage therein of said electric power cord.

* * * * *